(12) United States Patent
Zheng

(10) Patent No.: US 11,690,477 B2
(45) Date of Patent: Jul. 4, 2023

(54) PELLET GRILL

(71) Applicant: Ningbo Huige Outdoor Products Co., Ltd., Zhejiang (CN)

(72) Inventor: Songcun Zheng, Zhejiang (CN)

(73) Assignee: Ningbo Huige Outdoor Products Co., Ltd., Zhejiang (CN)

( * ) Notice: Subject to any disclaimer, the term of this patent is extended or adjusted under 35 U.S.C. 154(b) by 123 days.

(21) Appl. No.: 17/306,842

(22) Filed: May 3, 2021

(65) Prior Publication Data

US 2022/0233021 A1 Jul. 28, 2022

(30) Foreign Application Priority Data

Jan. 26, 2021 (CN) .......................... 202110104280.0

(51) Int. Cl.
*A47J 37/07* (2006.01)
*A47J 37/06* (2006.01)

(52) U.S. Cl.
CPC ....... *A47J 37/0704* (2013.01); *A47J 37/0786* (2013.01)

(58) Field of Classification Search
CPC .. A47J 37/0704; A47J 37/0786; Y02A 40/928
See application file for complete search history.

(56) References Cited

U.S. PATENT DOCUMENTS

| | | | | |
|---|---|---|---|---|
| 101,177 A | * | 3/1870 | Stevenson | F24B 13/008 126/245 |
| 1,203,773 A | * | 11/1916 | O'Brien | F24B 1/1895 126/537 |
| 1,903,634 A | * | 4/1933 | Robinson | F23H 9/02 110/275 |
| 1,998,210 A | * | 4/1935 | Underwood | F26B 17/106 34/171 |
| 3,126,881 A | * | 3/1964 | Blotsky | A47J 37/0786 126/25 C |
| 3,369,482 A | * | 2/1968 | Kahn | A47J 37/0763 99/450 |
| 5,809,991 A | * | 9/1998 | Pai | A47J 37/0786 126/245 |
| 9,585,518 B1 | * | 3/2017 | Phillips | A47J 37/0718 |

(Continued)

*Primary Examiner* — Jorge A Pereiro
*Assistant Examiner* — Logan P Jones
(74) *Attorney, Agent, or Firm* — JCIPRNET

(57) ABSTRACT

A pellet grill includes a grill body, a burning chamber and a wire grid arranged in the grill body. The wire grid is arranged above the burning chamber. A pellet inlet is formed in a lateral portion of the grill body. A fire-proof partition plate is arranged between the wire grid and the burning chamber and partitions the grill body into an upper cavity and a lower cavity. The burning chamber is arranged in the lower cavity. The wire grid is arranged above the upper cavity. A fire-pervious window is arranged on the fire-proof partition plate and is located above the burning chamber. An opening and closing device for controlling the fire-pervious window to be opened to realize higher temperature or closed to realize lower temperature is arranged on the fire-pervious window. An ash removal mechanism for removing ash accumulated in the burning chamber is arranged on the grill body.

10 Claims, 14 Drawing Sheets

(56) References Cited

U.S. PATENT DOCUMENTS

| | | | | |
|---|---|---|---|---|
| 2004/0194679 A1* | 10/2004 | Mendive | ................... | F23J 1/06 |
| | | | | 110/165 R |
| 2013/0298894 A1* | 11/2013 | Kleinsasser | ......... | A47J 37/0704 |
| | | | | 126/25 R |
| 2018/0296031 A1* | 10/2018 | Terrell, Jr. | .......... | A47J 37/0786 |
| 2018/0368618 A1* | 12/2018 | Measom | ............. | A47J 37/0704 |

* cited by examiner

PELLET GRILL

CROSS-REFERENCE TO RELATED APPLICATION

This application claims the priority benefit of China application serial no 202110104280.0, filed on Jan. 26, 2021. The entirety of the above-mentioned patent application is hereby incorporated by reference herein and made a part of this specification.

BACKGROUND

Technical Field

The invention relates to a grill, in particular to a pellet grill.

Description of Related Art

Pellet grills are cookers for heating based on particle burning. Conventional pellet grill typically comprises a grill body. A burning chamber is arranged in the grill body, a wire grid is arranged above the burning chamber, a feed inlet is formed in a lateral portion of the grill body, and pellets to be burnt are fed into the burning chamber via the feed inlet and are burnt in the burning chamber to generate heat to roast food on the wire grid. According to the pellet grill of such a structure, an internal space of the grill body is relatively large, so that heat generated by burning pellets is uniformly distributed in the grill body, a temperature of the grill cannot be effectively increased even if more combustible materials are fed, so it takes a long time to roast food, the cooking efficiency is low, and such pellet grill is generally used as smoker. The existing pellet grill has only one function and cannot satisfy the ever increasing usage requirements of users. In addition, when intended to remove ash in the burning chamber of the existing pellet grill, the wire grid needs to be disassembled from the grill body, then the ash in the burning chamber can be removed with an extra cleaning tool (such as a vacuum cleaner), and the wire grid is assembled on the grill body again afterwards. The whole ash removal process is complicated, time-consuming and labor-consuming, and the extra cleaning tool needs to be carried, which renders inconvenience.

SUMMARY

The technical issue to be settled by the invention is to provide a pellet grill, which has a simple structure and various functions and allows ash in a burning chamber to be removed easily.

The technical solution adopted by the invention to settle the aforesaid technical issue is as follows.

A pellet grill comprises a grill body, wherein a burning chamber and a wire grid are arranged in the grill body, the wire grid is arranged above the burning chamber, a pellet inlet is formed in a lateral portion of the grill body, a fire-proof partition plate is arranged between the wire grid and the burning chamber and partitions an inner cavity of the grill body into an upper cavity and a lower cavity which are independent from each other, the burning chamber is arranged in the lower cavity, the wire grid is arranged above the upper cavity, a fire-pervious window is arranged on the fire-proof partition plate and is located above the burning chamber, and an opening and closing device for controlling the fire-pervious window to be opened for higher temperature or closed for lower temperature is arranged on the fire-pervious window. An ash removal mechanism for removing ash accumulated in the burning chamber is arranged on the grill body.

In a preferred embodiment, the fire-pervious window is formed with a plurality of first fire-previous through grooves vertically penetrating through the fire-pervious window, the plurality of first fire-pervious through grooves are parallel to and spaced apart from one another in a front-back direction, the opening and closing device comprises a cover plate which is attached to and covers the fire-pervious window, the cover plate is formed with second fire-pervious through grooves vertically penetrating through the cover plate and matched with the first fire-pervious through grooves, each of the second fire-pervious through grooves is correspondingly arranged above a respective one of the first fire-pervious through grooves, and the cover plate is movably arranged forwards and backwards on the fire-pervious window in the front-back direction. When the first fire-pervious through grooves and the second fire-pervious through grooves are vertically aligned, the fire-pervious window is opened to realize higher temperature. When the first fire-pervious through grooves and the second fire-pervious through grooves are vertically staggered, the fire-pervious window is closed to realize lower temperature.

In a preferred embodiment, the fire-pervious window is a rectangular protrusion arranged on the fire-proof partition plate, the first fire-pervious through grooves are formed in an upper surface of the rectangular protrusion, two side surfaces of the rectangular protrusion are arranged in the front-back direction and are perpendicular to a front mounting plate of the grill body, a rectangular cover matched with the rectangular protrusion is arranged on the cover plate and protrudes upwards, the second fire-pervious through grooves are formed in the rectangular cover, the rectangular cover covers the rectangular protrusion, a lower surface of the rectangular cover is attached to the upper surface of the rectangular protrusion, two inner side surfaces of the rectangular cover are attached to corresponding side surfaces of the rectangular protrusion respectively, and a vertical distance between an inner front surface of the rectangular cover and an inner back surface of the rectangular cover is greater than the vertical distance between a front surface of the rectangular protrusion and a back surface of the rectangular cover.

In a preferred embodiment, the plurality of first fire-pervious through grooves are arranged regularly, and a vertical distance in the front-back direction between close ends of the adjacent two first fire-pervious through grooves is greater than a width of each of the first fire-pervious through grooves in the front-back direction.

In a preferred embodiment, the pushing mechanism for driving the cover plate to move in the front-back direction is arranged between the cover plate and the grill body. The pushing mechanism comprises a push rod arranged in the grill body and perpendicular to the front mounting plate of the grill body. A screw is coaxially connected to a front end of the push rod, a nut matched with the screw is arranged on an inner wall of the front mounting plate of the grill body, the screw is screwed in the nut, a front end of the screw stretches out of the front mounting plate of the grill body and is fixedly connected to an operation knob, a vertical mounting wall is arranged on a front portion of the cover plate, and a rear end of the push rod is fixedly arranged on the mounting wall.

In a preferred embodiment, the screw comprises a knob mounting portion and a screw portion which are coaxially arranged in the front-back direction. The knob mounting portion is arranged outside the grill body and is fixedly connected to the operation knob, the screw portion penetrates through the front mounting plate of the grill body and is screwed in the nut, and a rear end of the screw portion stretches out of the nut and is coaxially and fixedly connected to the push rod.

In a preferred embodiment, the push rod is detachably fixed to the mounting wall and is detachably fixed to the screw.

In a preferred embodiment, the fire-proof partition plate is inclined from left to right, the burning chamber is located on a left side of the inner cavity of the grill body, and an oil collection tank is arranged on the inner wall of a right mounting plate of the grill body. The oil collection tank is formed with an oil outlet communicated with outside, and a right end of the fire-proof partition plate is connected to the oil collection tank.

In a preferred embodiment, a first ash falling port is formed in a bottom portion of the lower cavity and vertically penetrates through the bottom portion of the lower cavity, a second ash falling port matched with the first ash falling port is formed in a bottom portion of the burning chamber and vertically penetrates through the bottom portion of the burning chamber, the bottom portion of the burning chamber is attached to the inner surface of the bottom of the lower cavity, and the second ash falling port is arranged over the first ash falling port. The ash removal mechanism comprises an ash collection box arranged below the grill body, the ash collection box includes an ash collection cavity having a top opening, the ash collection cavity is arranged below the first ash falling port, and a partition plate is arranged between the first ash falling port and the ash collection cavity, and is formed with an ash removal port matched with the first ash falling port and vertically penetrating through the partition plate. The partition plate is rotatably attached to the lower surface of the bottom portion of the grill body. When the ash removal port and the first ash falling port are aligned, the first ash falling port is communicated with the ash collection cavity for ash removal. When the ash removal port and the first ash falling port are staggered, the first ash falling port is separated from the ash collection cavity by the partition plate.

In a preferred embodiment, a rotary mounting hole is formed in a center of the partition plate and vertically penetrates through the partition plate, a mounting bolt matched with the rotary mounting hole penetrates through the rotary mounting hole, a rod portion of the mounting bolt penetrates through the rotary mounting hole from bottom to top and is screwed to the bottom portion of the grill body, the rotary mounting hole and the rod portion of the mounting bolt are rotatably connected, and the ash removal port is located in one side of the rotary mounting hole. A support spring is disposed around the mounting bolt, and two ends of the support spring are respectively supported the partition plate and a head portion of the mounting bolt, so that the upper surface of the partition plate is closely attached to the lower surface of the bottom portion of the grill body.

In a preferred embodiment, a rotation control mechanism configured for driving rotation of the partition plate to enable communication or separation of the first ash falling port and the ash collection cavity is arranged on the partition plate. The partition plate is circular, the rotation control mechanism comprises a positioning and mounting ring disposed around the partition plate and fixedly arranged on the lower surface of the bottom portion of the grill body, a guide slot is formed in a side wall of the positioning and mounting ring and penetrates through the positioning and mounting ring, a horizontal rotary control lever is arranged on a lower surface of the partition plate, a first end of the rotary control lever is fixedly mounted on the lower surface of the partition plate, a second end of the rotary control lever penetrates through the guide slot and is arranged outside the positioning and mounting ring, and the rotary control lever is slidable along the guide slot to drive the partition plate to rotate.

In a preferred embodiment, when the rotary control lever is located at a first end of the guide slot, the first ash falling port and the ash removal port are in an aligned state, and when the rotary control lever is located at a second end of the guide slot, the first ash falling port and the ash removal port are in a staggered state. A lock slot is arranged at the second end of the guide slot, corresponding to the staggered state of the first ash falling port and the ash removal port. A width of the lock slot in the vertical direction is greater than a width of the guide slot in the vertical direction, the lock slot is communicated with the guide slot, and a lock pillar matched with the lock slot is movably disposed around the rotary control lever; when the lock pillar is engaged with the lock slot, the first ash falling port and the ash removal port are locked in the staggered state, and a lock support mechanism for stably engaging the lock pillar with the lock slot is arranged between the lock pillar and the second end of the rotary control lever. A limiting portion is coaxially arranged on the lock pillar in a direction towards the second end of the rotary control lever, an outer diameter of the limiting portion is greater than an outer diameter of the lock pillar, a first limiting ring is coaxially arranged on the limiting portion in a direction towards the second end of the rotary control lever, an outer diameter of the first limiting ring is greater than the outer diameter of the limiting portion, a second limiting ring is coaxially arranged at the second end of the rotary control lever, the lock support mechanism is a lock spring arranged between the first limiting ring and the second limiting ring, and the lock spring is disposed around the rotary control lever; in a lock state, the lock pillar is engaged with the lock slot, the limiting portion abuts against the outer wall of the positioning and mounting ring, and two ends of the lock spring abut against two end surfaces, facing each other, of the first limiting ring and the second limiting ring, respectively.

In a preferred embodiment, a control handle is arranged at the second end of the rotary control lever.

In a preferred embodiment, the ash collection box is detachably mounted below the positioning and mounting ring and is a cylindrical ash collection box matched with the positioning and mounting ring, two mounting columns oppositely protrudes from an outer wall of the positioning and mounting ring. The ash collection box has two mounting parts respectively matched with the mounting columns, each of the mounting parts includes a vertical mounting notch, a horizontal slide mounting groove extending from a lower end of the mounting notch and communicated with the vertical mounting notch, and a positioning groove extending upward from a tail end of the slide mounting groove The two slide mounting grooves of the two mounting parts extend in the same direction from the mounting notches to the positioning grooves. When the ash collection box and the positioning and mounting ring are mounted to each other, the mounting columns respectively engage with the positioning grooves.

Compared with the prior art, the invention has the following advantages. The fire-proof partition plate is arranged between the wire grid and the burning chamber, and the fire-pervious window located above the burning chamber is arranged on the fire-proof partition plate and is controlled by the opening and closing device to be opened or closed. When the fire-pervious window is opened, head generated by burning in the burning chamber and part of flames can be directly conducted to the upper cavity via the fire-pervious window to roast food materials on the wire grid at a high temperature. When the fire-pervious window is closed, heat generated in the burning chamber is accumulated in the lower cavity and is conducted to the upper cavity via the fire-proof partition plate to smoke food materials on the wire grid at a low temperature. The pellet grill is simple in structure, and the functions of the pellet grill are expanded, such that the pellet grill not only has an original low-temperature smoking function, but also has a high-temperature roasting function, and the functions are diversified. In addition, the ash removal mechanism for removing ash accumulated in the burning chamber is arranged on the grill body, so that an extra ash removal tool does not need to be carried anymore, ash deposited at the bottom portion of the burning chamber can be removed conveniently, and the pellet grill is simple in structure and convenient to use.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
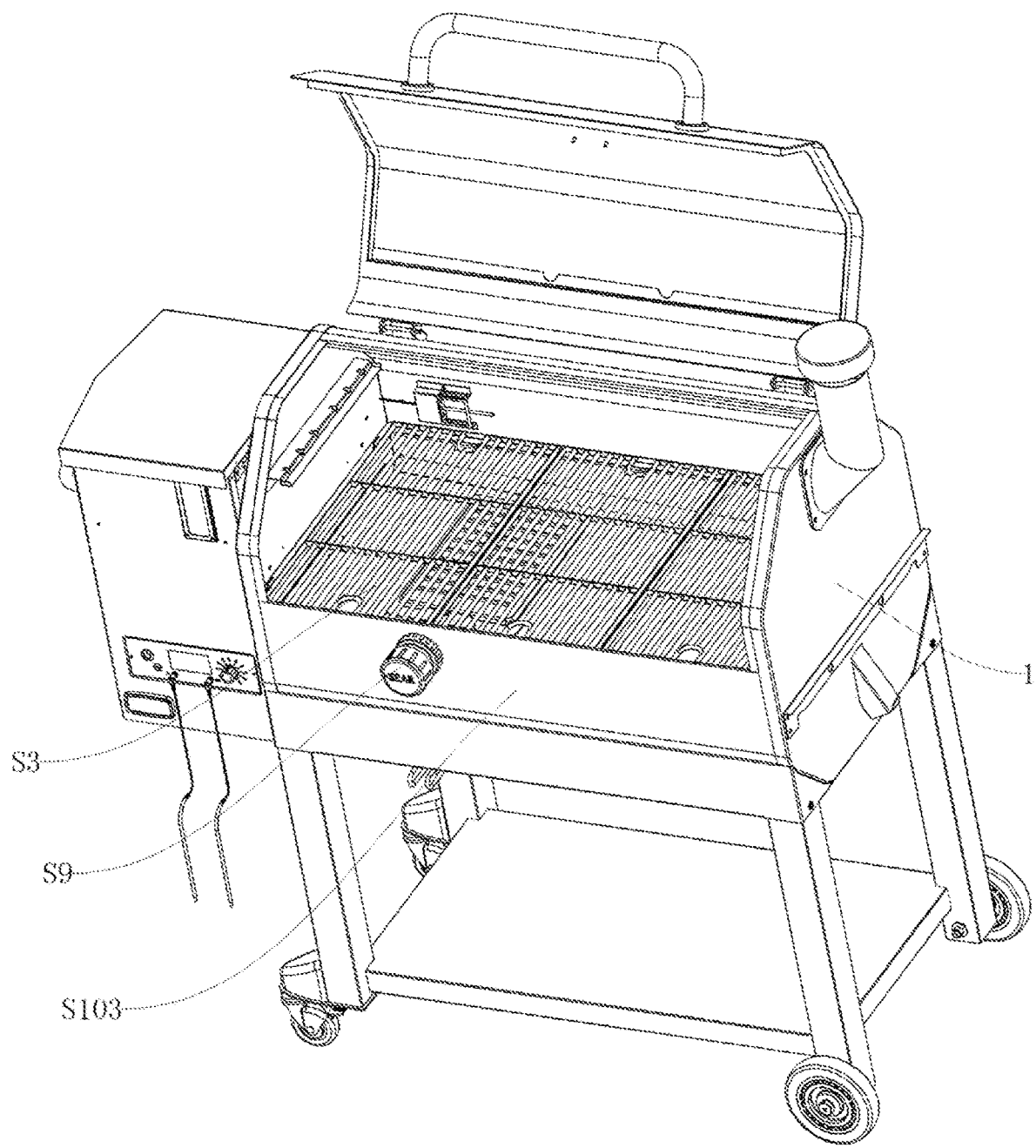
FIG. 1 is a perspective view of the invention after a side platform is removed.
Figure 2:
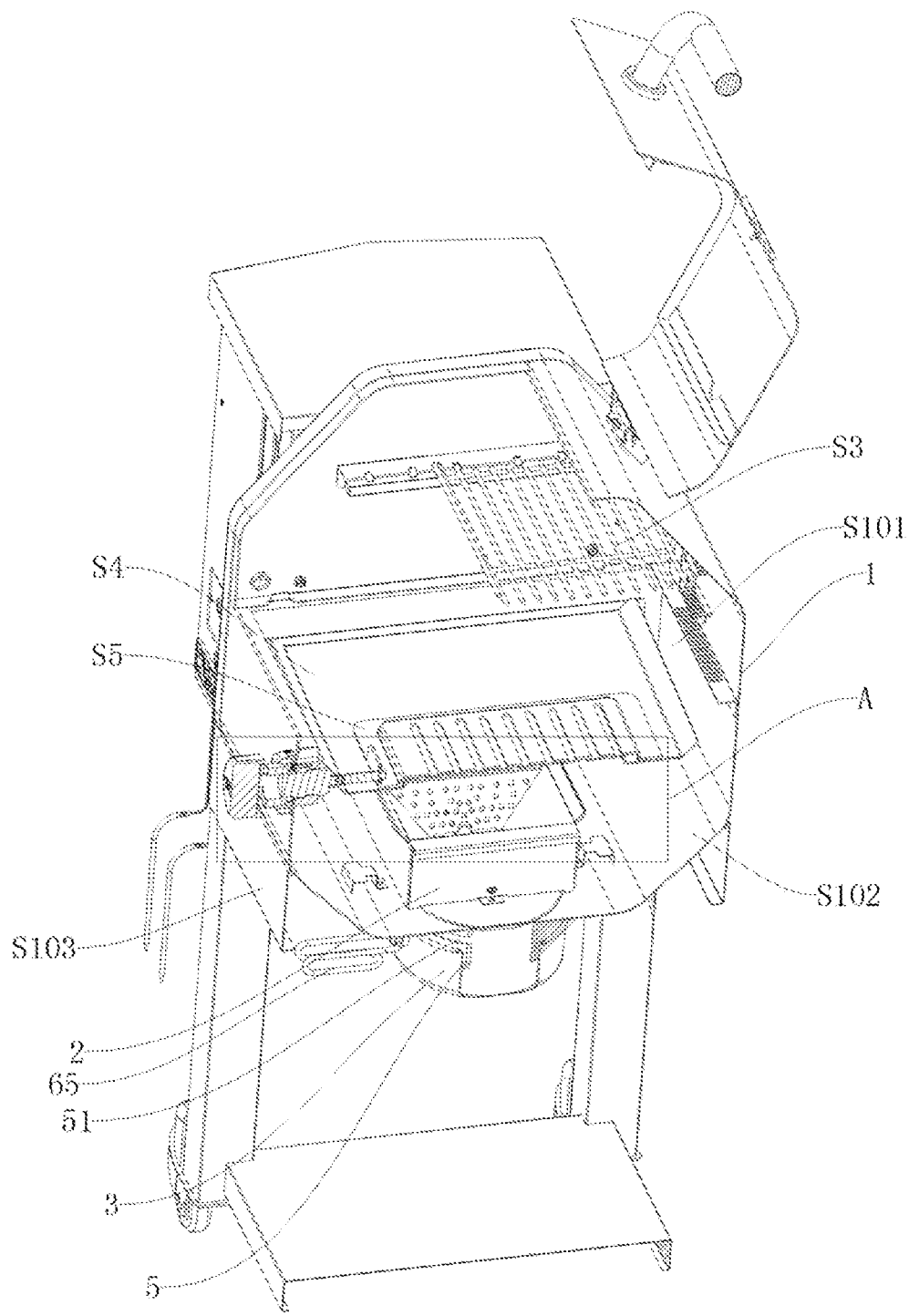
FIG. 2 is a sectional view of the invention in a lower-temperature smoking state (a fire-pervious window is closed)
Figure 3:
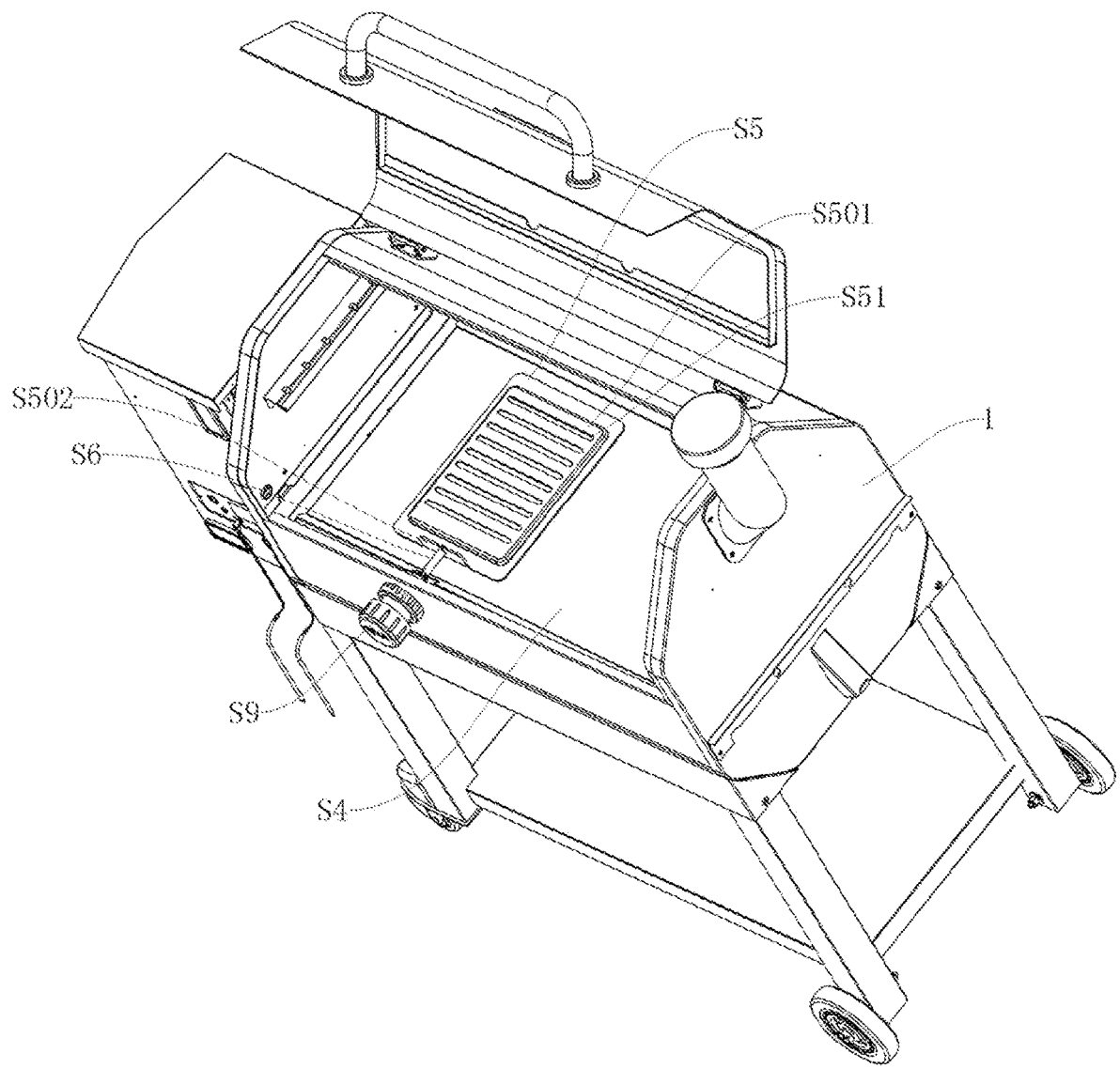
FIG. 3 is a structural view of the invention in the lower-temperature smoking state (the fire-pervious window is closed) after a wire grid is removed.
Figure 4:
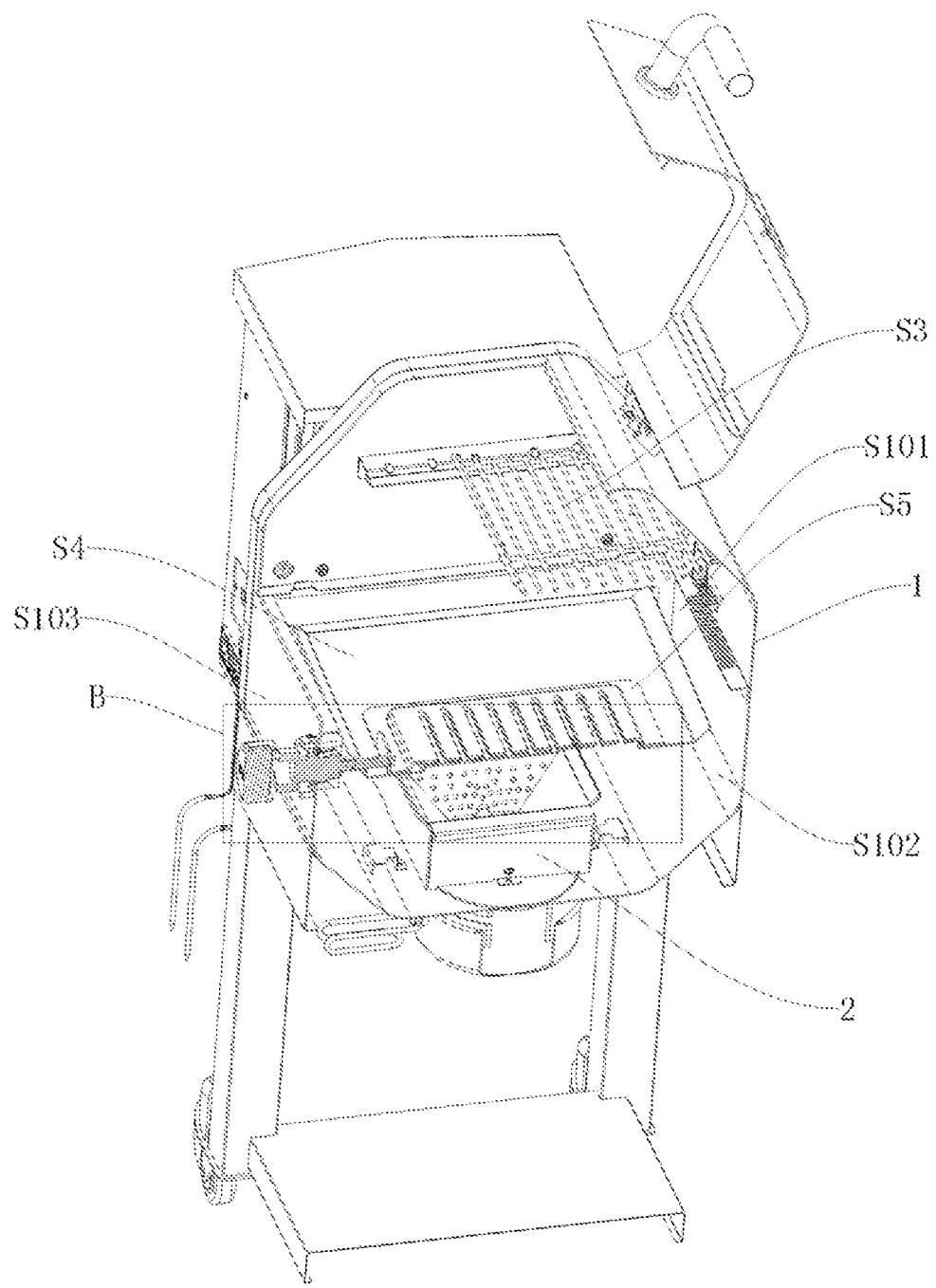
FIG. 4 is a sectional view of the invention in a higher-temperature roasting state (the fire-pervious window is opened)
Figure 5:
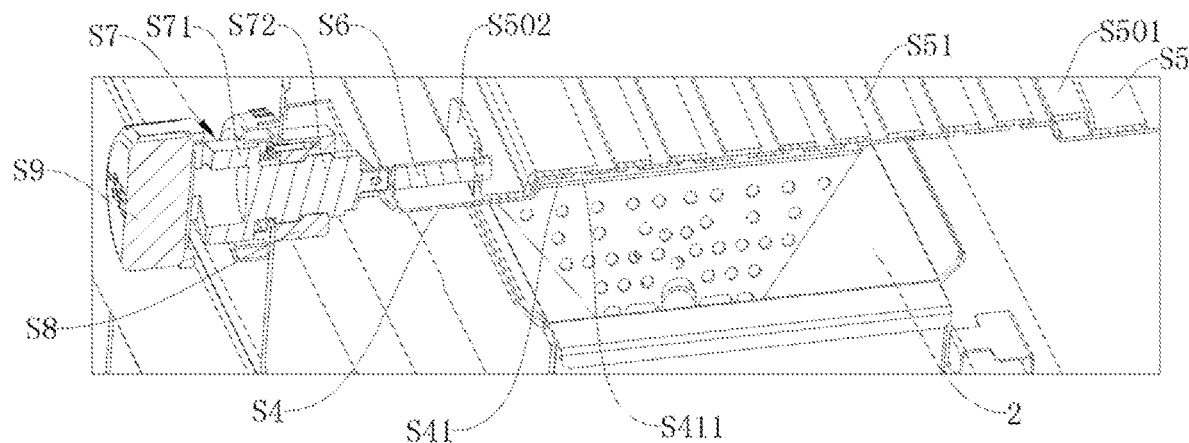
FIG. 5 is an enlarged view of part A in FIG. 2.
Figure 6:
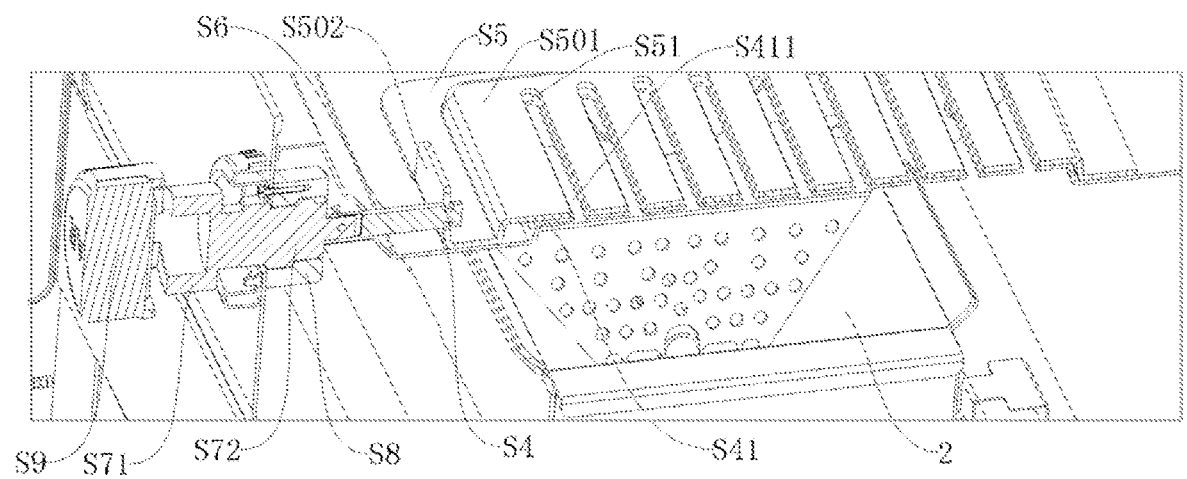
FIG. 6 is an enlarged view of part B in FIG. 4.
Figure 7:
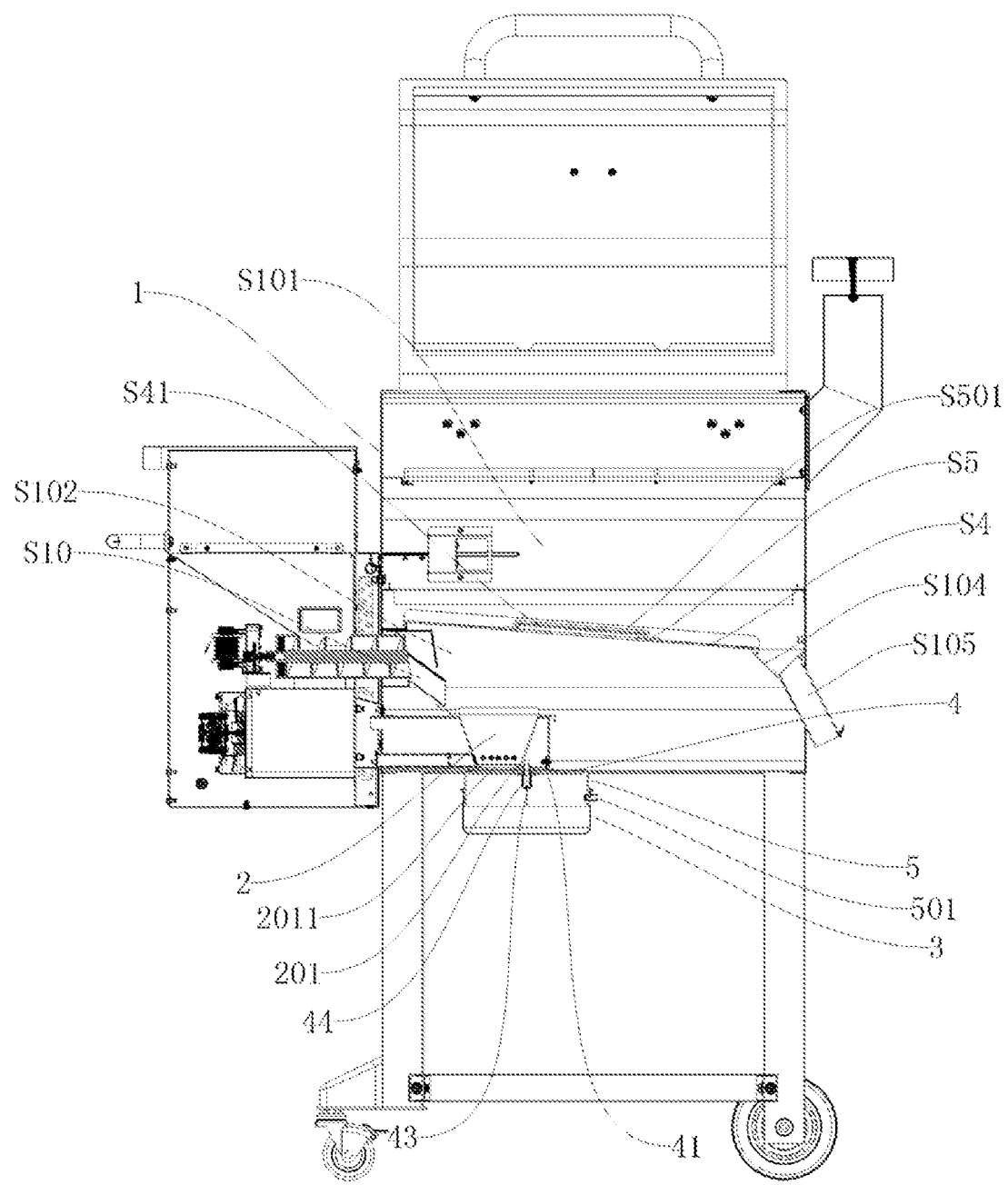
FIG. 7 is a sectional view of the invention.

The invention will be described in further detail below in conjunction with the accompanying drawings and embodiments.

As shown in FIG. 1 to FIG. 9, a pellet grill comprises a grill body 1. A burning chamber 2 and a wire grid S3 are arranged in the grill body 1, and the wire grid S3 is arranged above the burning chamber 2. A pellet inlet S10 is formed in a lateral portion of the grill body 1. A fire-proof partition plate S4 is arranged between the wire grid S3 and the burning chamber 2 and partitions an inner cavity of the grill body 1 into an upper cavity S101 and a lower cavity S102 which are independent from each other. The burning chamber 2 is arranged in the lower cavity S102, the wire grid S3 is arranged on the upper cavity S101, a fire-pervious window S41 is arranged on the fire-proof partition plate S4 and is located above the burning chamber 2, and an opening and closing device for controlling the fire-pervious window S41 to be opened to realize higher temperature for roasting or be closed to realize lower temperature for smoking is arranged on the window S41 pervious to fire. An ash removal mechanism for removing ash accumulated in the burning chamber 2 is arranged on the grill body 1.

In this specific embodiment, the fire-pervious window S41 is formed with a plurality of first fire-pervious through grooves S411 vertically penetrating through the fire-pervious window S41, the plurality of first fire-pervious through grooves S411 are parallel to and spaced apart from one another in a front-back direction. The opening and closing device comprises a cover plate S5 attached to and covers the fire-pervious window S41, the cover plate S5 is formed with second fire-previous through grooves S51 vertically penetrating through the cover plate S5 and matched with the first fire-pervious through grooves S51. Each of the second fire-pervious through grooves S51 is correspondingly arranged above a respective one of the first fire-pervious through grooves S411, and the cover plate S5 is able to move forwards and backwards (in the front-back direction) on the fire-pervious window S41. When the first fire-pervious through grooves S411 and the second fire-pervious through grooves S51 are vertically aligned, the fire-pervious window S41 is opened to realize higher temperature for roasting. When the first fire-pervious through grooves S411 and the second fire-pervious through grooves S51 are staggered, the fire-pervious window S41 is closed to realize lower temperature for smoking. The fire-pervious opening and closing device is simple in structure, easy to operate and low in cost.

In this specific embodiment, the fire-pervious window S41 is a rectangular protrusion arranged on the fire-proof partition plate S4, and the first fire-pervious through grooves S411 are formed in an upper surface of the rectangular protrusion. Two side surfaces of the rectangular protrusion are arranged from front to back (in the front-back direction) and are perpendicular to a front mounting plate S103 of the grill body 1. A rectangular cover S501 protruding upwards and matched with the rectangular protrusion is arranged on the fire-pervious cover plate S5, and the second fire-pervious through grooves S51 are formed in the rectangular cover S501 which covers the rectangular protrusion. A lower surface of the fire-pervious cover plate S5 is attached to an upper surface of the fire-proof partition plate S4, that is, a lower surface of the rectangular cover S501 is attached to the upper surface of the rectangular protrusion. Two inner side surfaces of the rectangular cover S501 are attached to corresponding side surfaces of the rectangular protrusion, and a vertical distance from an inner surface of the front side of the rectangular cover S501 to an inner surface of the back side of the rectangular cover S501 is greater than a vertical distance from a front surface of the rectangular protrusion to a back surface of the rectangular cover S501. The rectangular protrusion is matched with the rectangular cover S501, so that the cover plate S5 can be mounted stably, and the movement of the cover plate S5 is guided and limited by the rectangular protrusion to ensure that the cover plate S5 can only move forwards or backwards. The lower surface of the cover plate S5 is attached to the upper surface of the fire-proof partition plate S4, and the lower surface of the rectangular cover S501 is attached to the upper surface of the rectangular protrusion, so that the fire-pervious window S41 can be closed stably.

Figure 8:
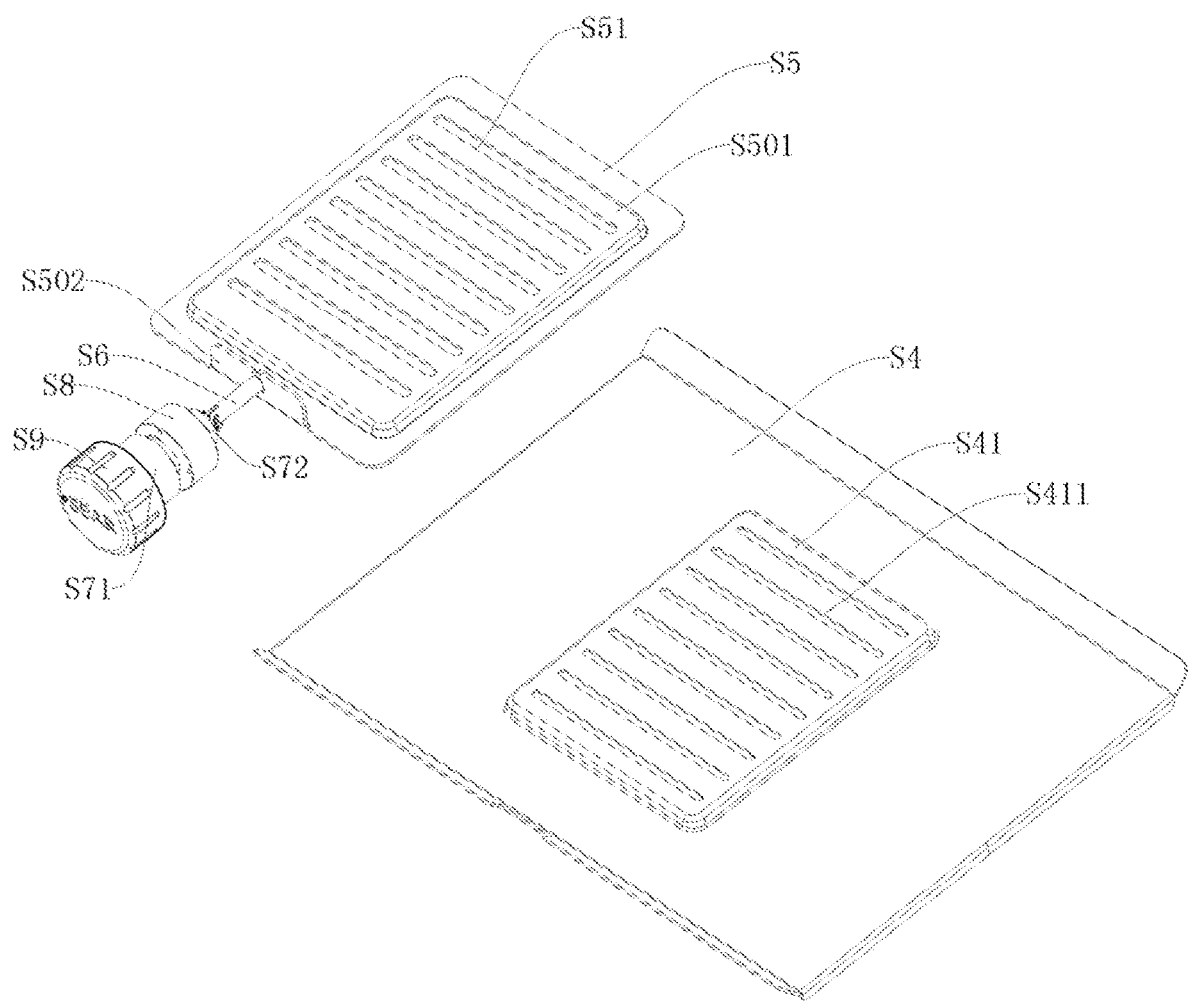
FIG. 8 is an exploded view of a fire-proof partition plate and a cover plate for a fire-pervious window of the invention.
Figure 9:
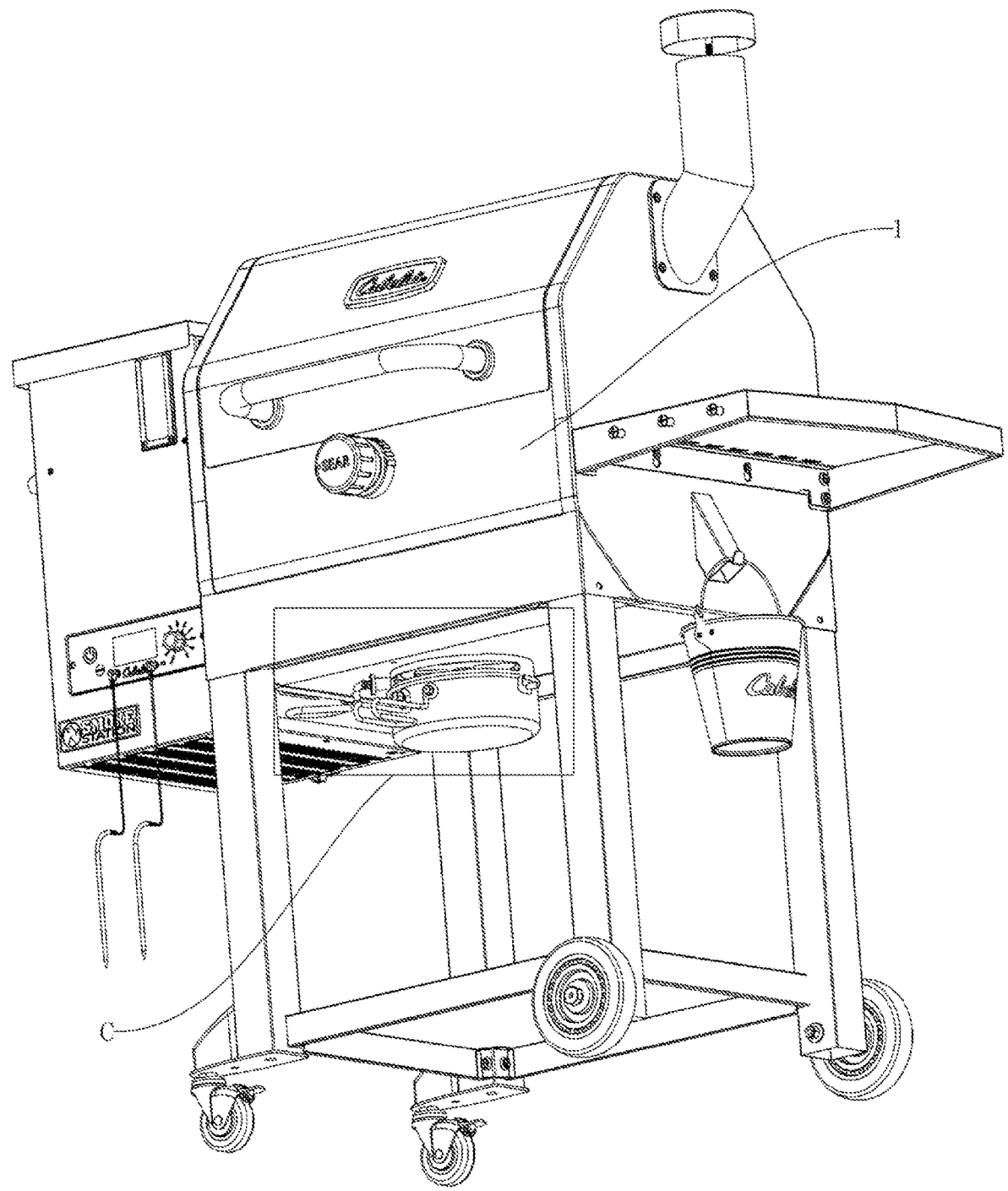
FIG. 9 is an overall perspective view of the invention.

In this specific embodiment, as shown in FIG. 8, the plurality of first fire-pervious through grooves S411 are arranged regularly, and a vertical distance in the front-back direction between close ends of the adjacent two first fire-pervious through grooves S411 is greater than a width of each of the first fire-pervious through grooves S411 in the front-back direction, so it is ensured that the fire-pervious window S41 is certainly closed when the first fire-pervious through grooves S411 and the second fire-pervious through grooves S51 are staggered.

In this specific embodiment, a pushing mechanism for driving the cover plate S5 to move forwards and backwards is arranged between the cover plate S5 and the grill body 1. The cover plate S5 is driven by the pushing mechanism to move forwards or backwards to open or close the fire-pervious window S41.

In this specific embodiment, the pushing mechanism comprises a push rod S6 arranged in the grill body 1 and perpendicular to the front mounting plate S103 of the grill body 1. A front end of the push rod S6 is coaxially connected to a screw S7, a nut S8 matched with the screw S7 is arranged on an inner wall of the front mounting plate S103 of the grill body 1, the screw S7 is screwed in the nut S8, a front end of the screw S7 stretches out of the front mounting plate S103 of the grill body 1 and is fixedly connected to an operation knob S9, a vertical mounting wall S502 is arranged on a front portion of the cover plate S5, and a rear end of the push rod S6 is fixedly arranged on the mounting wall S502. The pushing mechanism is simple in structure and easy to operate. Through the cooperation of the screw S7 and the nut S8, the position of the cover plate S5 can be locked; the cover plate S5 can be operated to move forwards or backwards easily outside the grill body 1 through the operation knob S9.

In this specific embodiment, as shown in FIG. 5 to FIG. 8, the screw S7 comprises a knob mounting portion S71 and a screw portion S72 which are coaxially arranged from front to back. The knob mounting portion S71 is arranged outside the grill body 1 and is fixedly connected to the operation knob S9, the screw portion S72 penetrates through the front mounting plate S103 of the grill body 1 to be screwed in the nut S8, and a rear end of the screw portion S72 stretches out of the nut S8 to be coaxially and fixedly connected to the push rod S6. The cooperation structure of the screw S7 and the nut S8 is simple and easy to assemble.

In this specific embodiment, the push rod S6 is detachably and fixedly connected to the mounting wall S502 and is detachably and fixedly connected to the screw S7. The detachable and fixed connection is beneficial to the maintenance, repair and replacement of the components.

In this specific embodiment, the fire-proof partition plate S4 is inclined from left to right, the burning chamber 2 is located on a left side of the inner cavity of the grill body 1, an oil collection tank S104 is arranged on an inner wall of a right mounting plate of the grill body 1 and has an oil outlet S105 communicated with the outside, and a right end of the fire-proof partition plate S4 is connected to the oil collection tank S104. By adoption of this structure, the fire-proof partition plate S4 can collect waste oil dropping from food on the wire grid S3 and can deliver the waste oil into the oil collection tank S104, and then, the waste oil is discharged via the oil outlet S105, communicated with the outside, in the oil collection tank S104.

In this specific embodiment, a first ash falling port 211 is formed in the bottom portion of the lower cavity S102 and vertically penetrates through the bottom portion of the lower cavity S102, and a second ash falling port 2011 matched with the first ash falling port 211 is formed in the bottom portion of the burning chamber 2 and vertically penetrates through the bottom portion of the burning chamber 2. The bottom portion of the burning chamber 2 is attached to an inner surface of the bottom portion of the lower cavity S102, and the second ash falling port 2011 is arranged over the first ash falling port 211. The ash removal mechanism comprises an ash collection box 3 arranged below the grill body 1 and provided with an ash collection cavity 31 having an opening in the top. The ash collection cavity 31 is arranged below the first ash falling port 211. A partition plate 4 is arranged between the first ash falling port 211 and the ash collection cavity 31, and is formed with an ash removal port 41 matched with the first ash falling port 211 and vertically penetrating through the partition plate 4. The partition plate 4 is rotatably attached to the lower surface of the bottom of the grill body 1. When the ash removal port 41 is aligned to the first ash falling port 211, the first ash falling port 211 is communicated with the ash collection cavity 31 to realize ash removal. When the ash removal port 41 and the first ash falling port 211 are staggered, the first ash falling port 211 and the ash collection cavity 31 are separated by the partition plate 4. The ash removal mechanism is simple in structure and easy to operate, and the ash removal port 41 and the first ash falling port 211 can be aligned or staggered by rotating the partition plate 3 to enable the burning chamber 2 and the ash collection box 3 to be communicated or separated.

In this specific embodiment, a rotary mounting hole 42 is formed in a center of the partition plate 4 and vertically penetrates through the center of the partition plate 4. A mounting bolt 43 matched with the rotary mounting hole 42 penetrates through the rotary mounting hole 42, and a rod portion of the mounting bolt 43 penetrates through the rotary mounting hole 42 from bottom to top and is screwed at the bottom of the grill body 1. The rotary mounting hole 42 and the rod portion of the mounting bolt 43 are rotatably connected, and the ash removal port 41 is located on one side of the rotary mounting hole 42. By adoption of this structure, the partition plate 4 can be stably mounted at the bottom of the grill body 1.

In this specific embodiment, a support spring 44 is disposed around the mounting bolt 43 and supported between the partition plate 4 and the mounting bolt 43, and two ends of the support spring 44 respectively abut against the partition plate 4 and the head of the mounting bolt 43, such that an upper surface of the partition plate 4 is closely attached to the lower surface of the bottom of the grill body 1. The support spring 44 can support the partition plate 4 attached to the bottom of the grill body 1 and ensure that the partition plate 4 can stably rotate around the rod portion of the mounting bolt 43.

In this specific embodiment, the partition plate 4 is provided with a rotation control mechanism used for driving the partition plate 4 to rotate, so as to enable the first ash falling port 211 and the ash collection cavity 31 to be communicated or separated. The partition plate 4 is driven by the rotation control mechanism to rotate, and the structure is simple, and operation is easy.

In this specific embodiment, the partition plate 4 is circular, the rotation control mechanism comprises a positioning and mounting ring 5 disposed around the partition plate 4 and fixedly arranged on the lower surface of the bottom portion of the grill body 1. A guide slot 51 is formed in a side wall of the positioning and mounting ring 5 and penetrates through the side wall the positioning and mounting ring 5 from inside to outside. A horizontal rotary control lever 6 is arranged on a lower surface of the partition plate 4, a first end of the rotary control lever 6 is fixedly mounted on the lower surface of the partition plate 4, a second end of the rotary control lever 6 penetrates through the guide slot 51 to be arranged outside the positioning and mounting ring 5, and the rotary control lever 6 is slidable along the guide slot 51 to drive the partition plate 4 to rotate. The rotary control mechanism is simple in structure and easy to operate. The guide slot 51 formed in the positioning and mounting ring 5 supports and guides the rotary control lever 6 during movement, and the rotary control lever 6 slides along the guide slot 51 to drive the partition plate 4 to rotate, and to enable the ash removal port 41 and the first ash falling port 211 to be aligned or staggered, so that the burning chamber 2 and the ash collection box 3 are communicated or separated.

Figure 11:
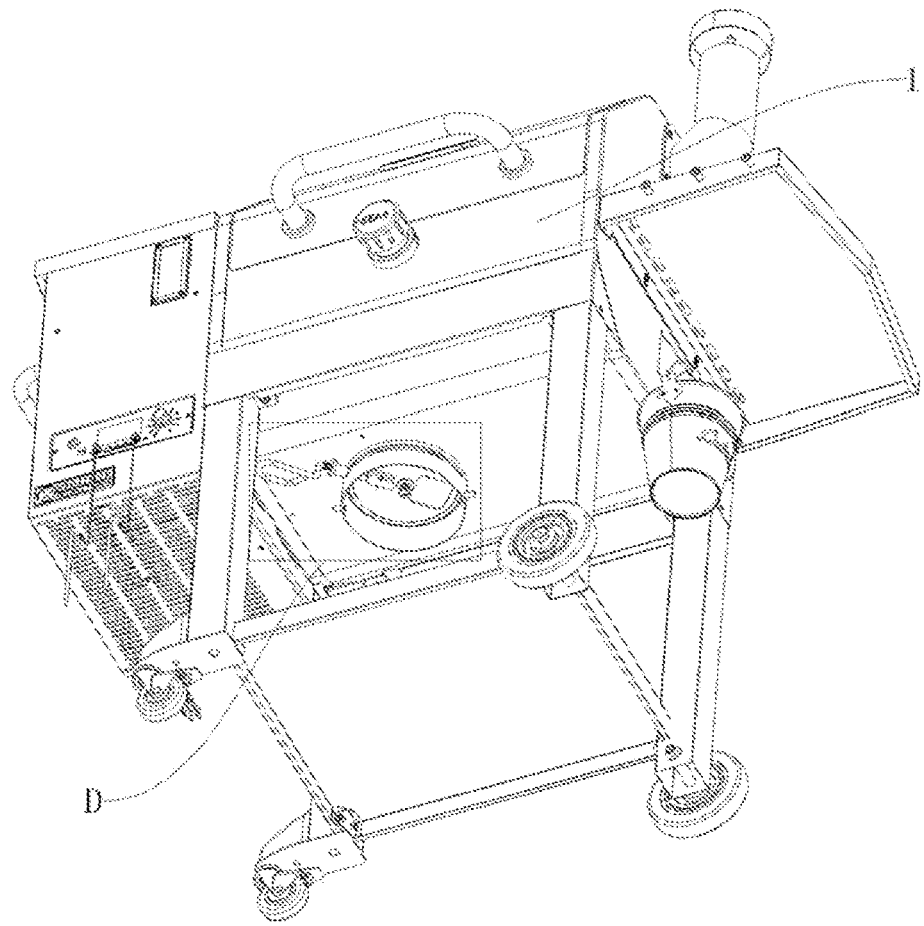
FIG. 11 is a structural view of the invention when an ash collection box is removed and an ash removal port and a first ash falling port are in a staggered state.
Figure 12:
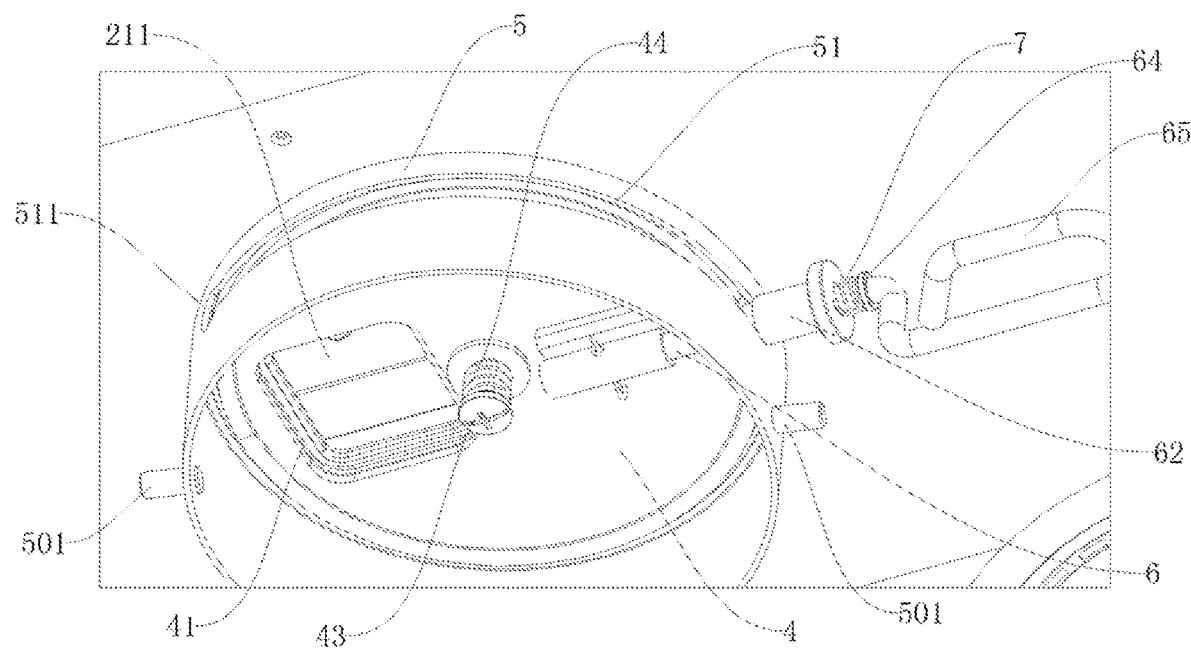
FIG. 12 is an enlarged view of part D in FIG. 11.
Figure 13:
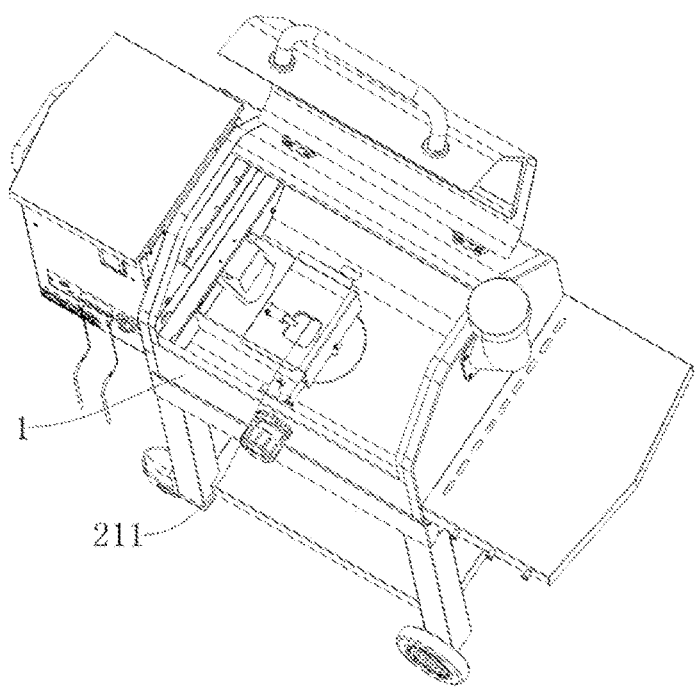
FIG. 13 is a structural view of the invention when the ash collection box is removed and the ash removal port and the first ash falling port are in an aligned state.
Figure 14:
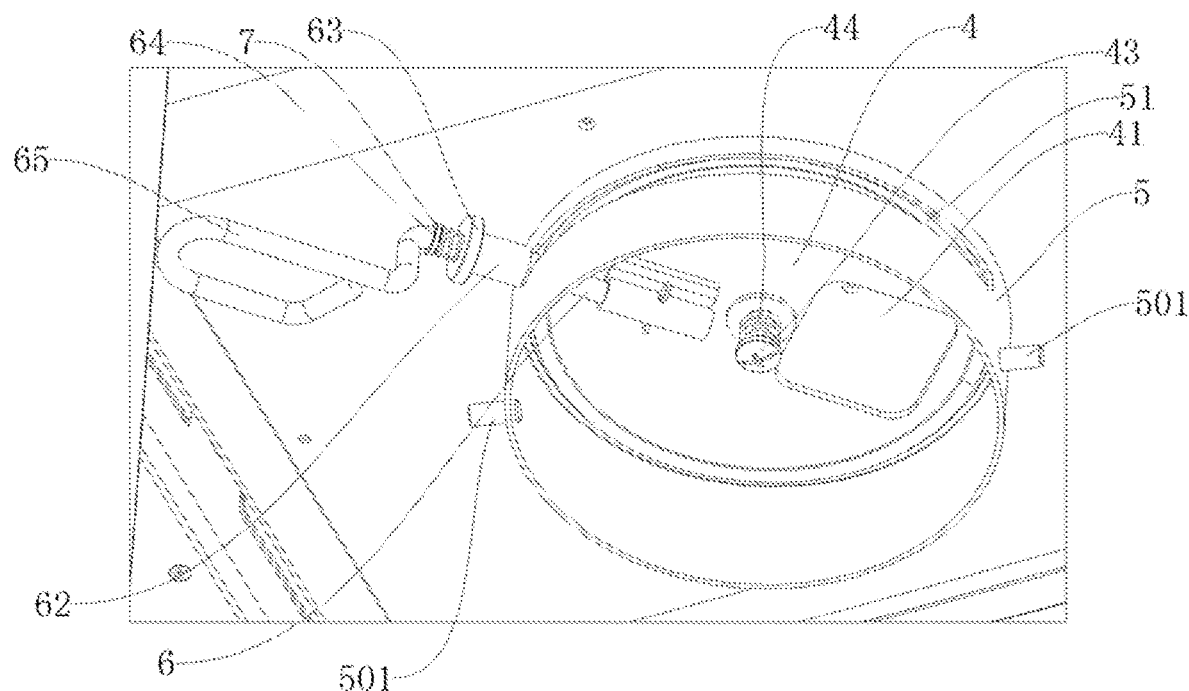
FIG. 14 is an enlarged view of part E in FIG. 13.
Figure 15:
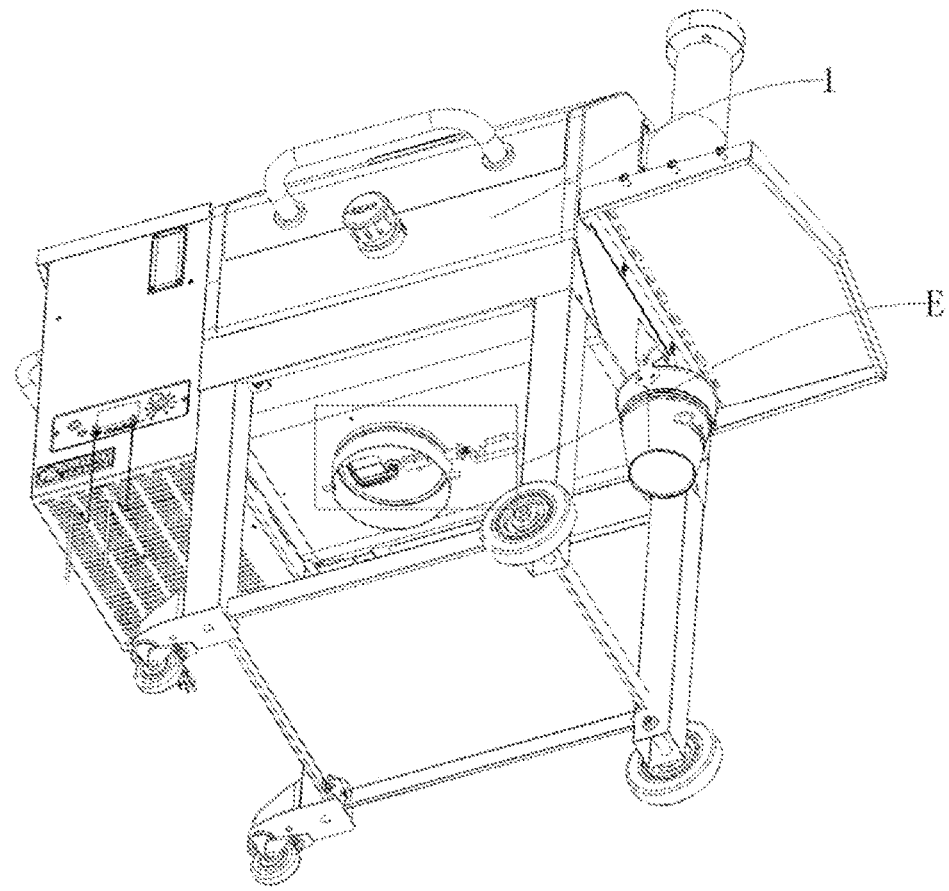
FIG. 15 is a structural view of the invention when the wire grid, the fire-proof partition plate and the burning chamber are removed and the ash removal port and the first ash falling port are aligned.

In this specific embodiment, when the rotary control lever 6 is located at a first end of the guide slot 51, the first ash falling port 211 and the ash removal port 41 are in an aligned state (see FIG. 13 and FIG. 14), and when the rotary control lever 6 is located at a second end of the guide slot 51, the first ash falling port 211 and the ash removal port 41 are in staggered state (see FIG. 11 and FIG. 12). The second end of the guide slot 51, corresponding to the staggered state of the first ash falling port 211 and the ash removal port 41, is formed with a lock slot 511. A vertical width of the lock slot 511 is greater than a vertical width of the guide slot 51, the lock slot 511 is communicated with the guide slot 51, and the lock pillar 61 matched with the lock slot 511 is movably disposed around the rotary control lever 6. When the lock pillar 61 is engaged with the lock slot 511, the first ash falling port 211 and the ash removal port 41 are locked in the staggered state, and a lock supporting mechanism for stably engaging the lock pillar 61 with the lock slot 511 is arranged between the lock pillar 61 and the second end of the rotary control lever 6. Through this structural design, the ash removal port 41 and the first ash falling port 211 can be stably locked in the staggered state, and it is ensured that fuel is burnt in the burning chamber 2 stably when the barbecue oven is used for a barbecue.

In this specific embodiment, a limiting portion 62 is coaxially arranged on the lock pillar 61 in a direction towards the second end of the rotary control lever 6. An outer diameter of the limiting portion 62 is greater than an outer diameter of the lock pillar 61. A first limiting ring 63 is coaxially arranged on the limiting portion 62 in a direction towards the second end of the rotary control lever 6. An outer diameter of the first limiting ring 63 is greater than the outer diameter of the limiting portion 62. A second limiting ring 64 is coaxially arranged at the second end of the rotary control lever 6, and the lock supporting mechanism is a lock spring 7 arranged between the first limiting ring 63 and the second limiting ring 64, and the lock spring 7 is disposed around the rotary control lever 6. In a lock state, the lock pillar 61 is engaged with the lock slot 511, the limiting portion 62 abuts against an outer wall of the positioning and mounting ring 5, and two ends of the lock spring 7 abut against two end surfaces, facing each other, of the first limiting ring 63 and the second limiting ring 64 respectively. The lock spring 7 locks and supports the lock pillar 61 in the lock slot 511. When the lock pillar 61 is intended to be unlocked, a user just needs to apply a force to the first limiting ring 63 to make the first limiting ring 63 move close to the second limiting ring 64, then the lock pillar 61 disengages from the lock slot 511, and at this moment, the rotary control lever 6 can be controlled to move in the guide slot 51. When the lock pillar 61 is intended to be locked, the force applied to the first limiting ring 63 is relieved, and then the lock pillar 61 can be engaged with the lock slot 511 under the restoration effect of the lock spring 7.

In a specific embodiment, a control handle 65 is arranged at the second end of the rotary control lever 6. The rotary control lever 6 can be rotated easily through the control handle 65.

In this specific embodiment, the ash collection box 3 is detachably mounted below the positioning and mounting ring 5. Ash accumulated in the ash collection box 3 can be removed and treated easily.

Figure 10:
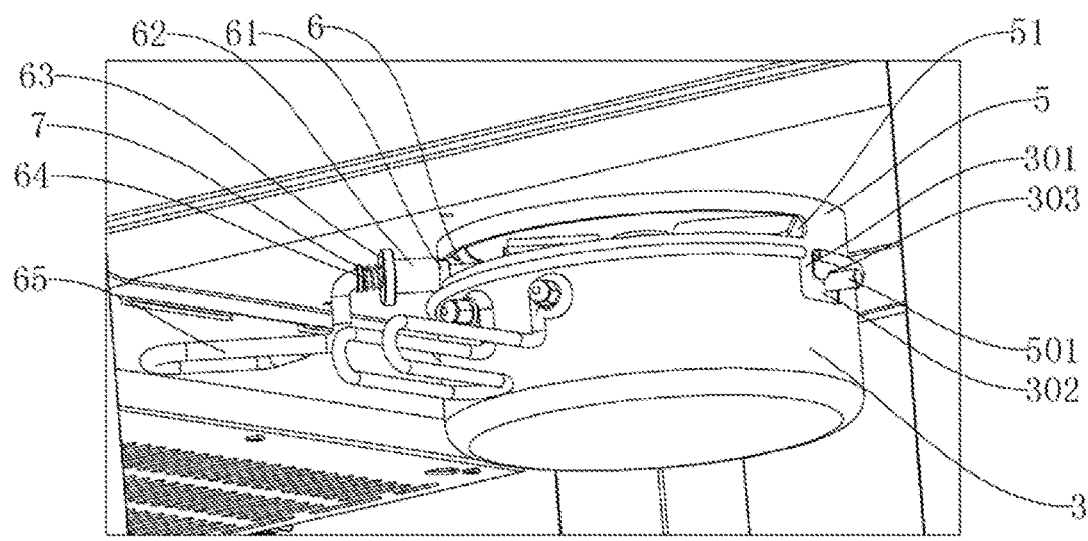
FIG. 10 is an enlarged view of part C in FIG. 9.
Figure 16:
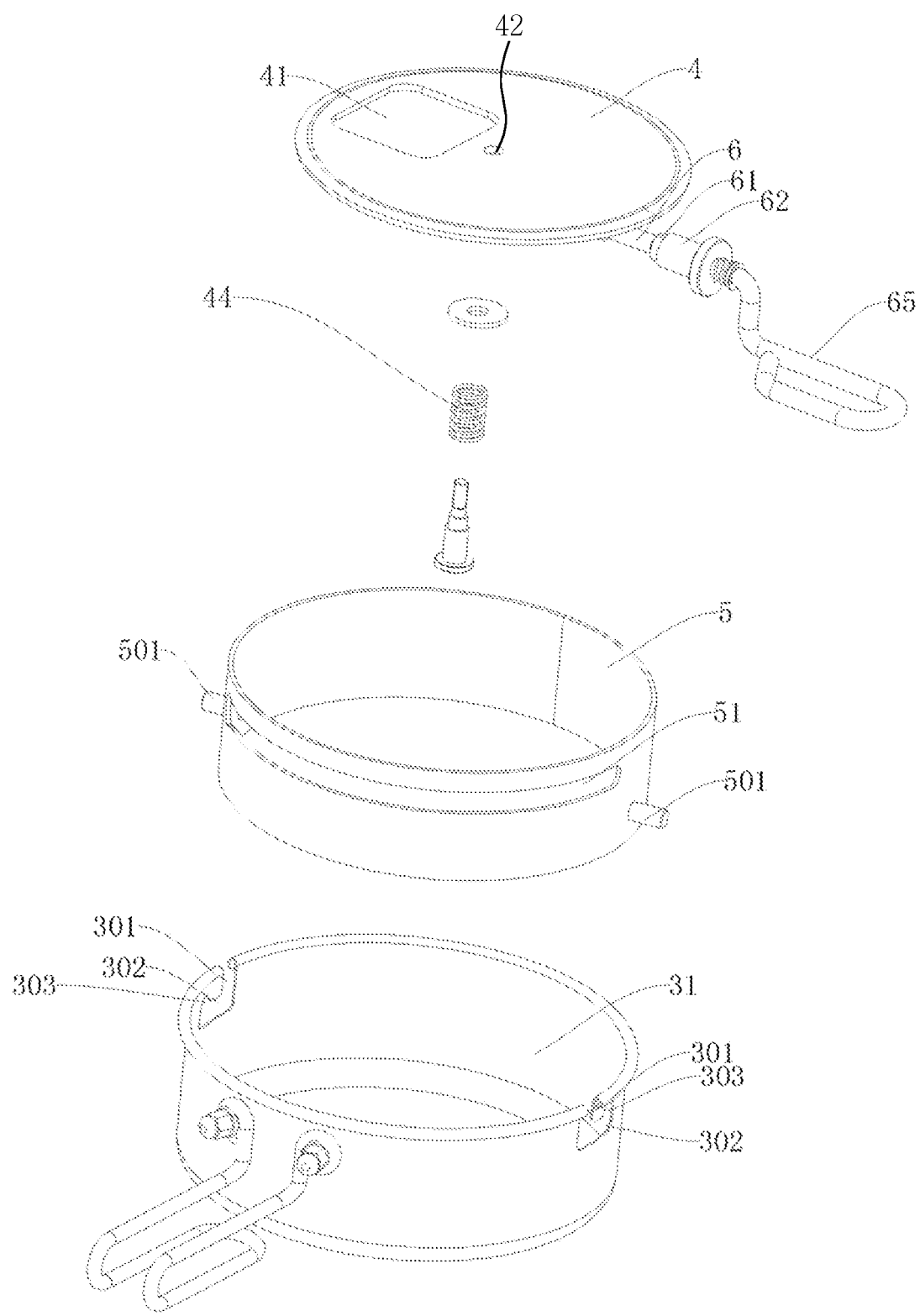
FIG. 16 is an exploded view of an ash removal mechanism of the invention.
Figure 17:
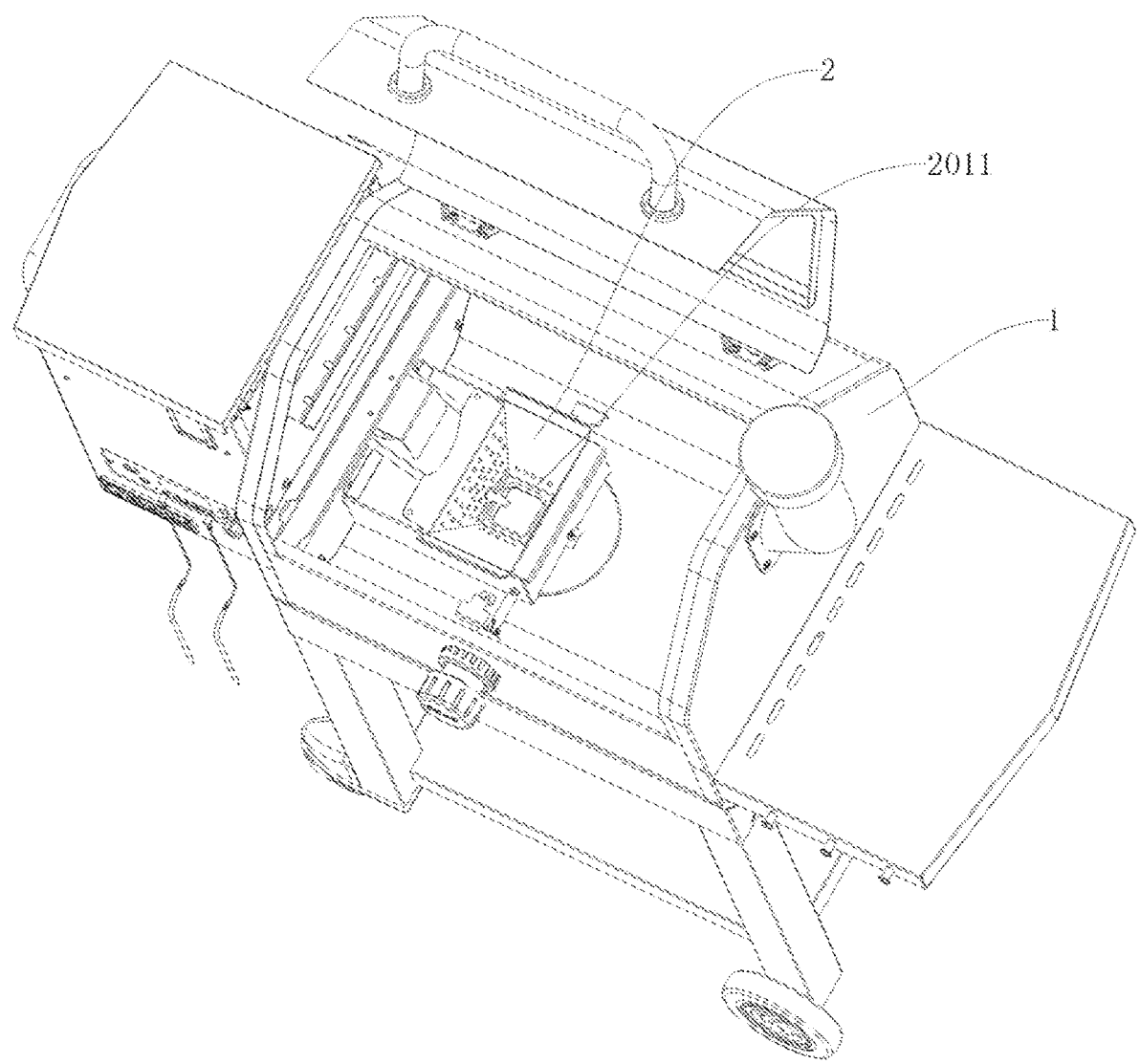
FIG. 17 is a structural view of FIG. 15 after the burning chamber is assembled.
Figure 18:
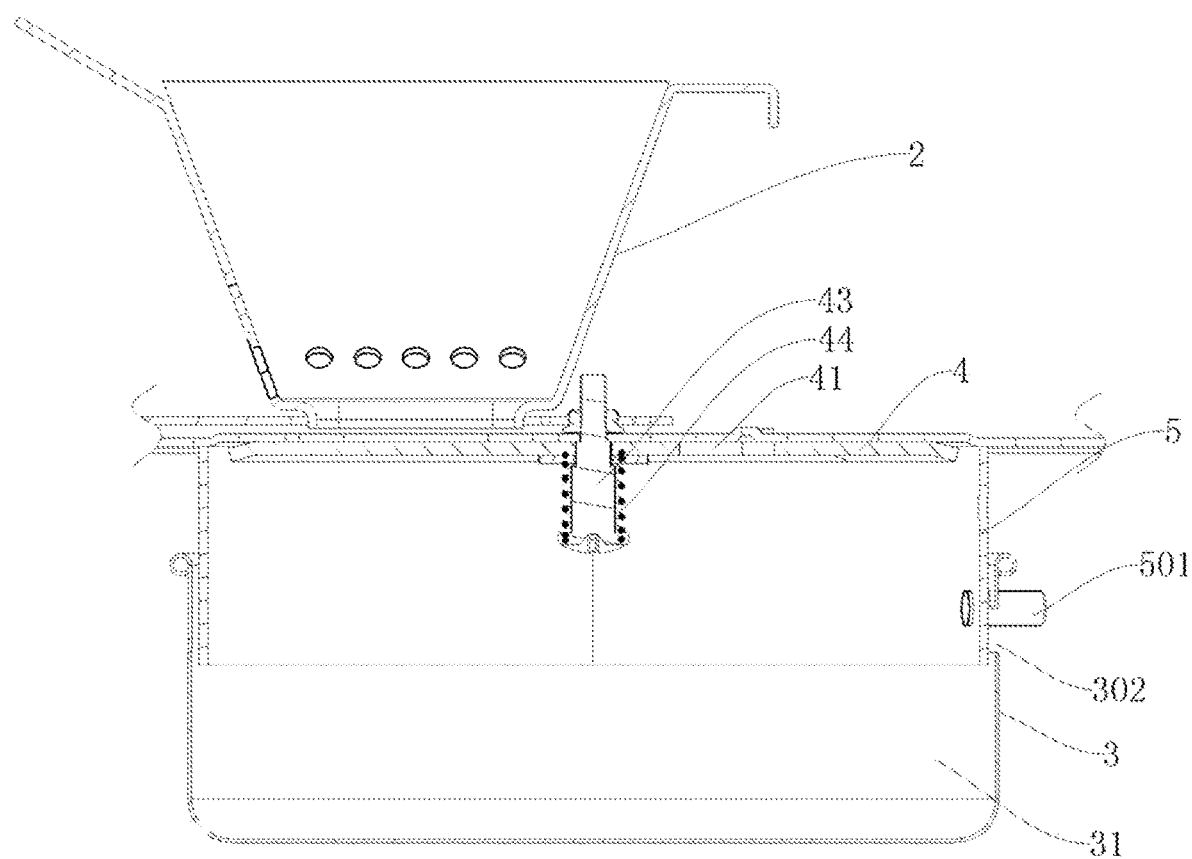
FIG. 18 is a partial sectional view of the invention when the ash removal port and the first ash falling port are staggered.

In this specific embodiment, as shown in FIG. 10, the ash collection box 3 is a cylindrical ash collection box matched with the positioning and mounting ring 5. Two mounting columns 501 oppositely protrude from an outer wall of the positioning and mounting ring. The ash collection box 3 is formed with two mounting parts respectively matched with the mounting columns 501. Each of the mounting parts includes a vertical mounting notch 301, a horizontal slide mounting groove 302 extending from a lower end of the mounting notch 301 and communicated with the vertical mounting notch 301, and a positioning groove 303 extending upward from a tail end of the slide mounting grooves 302. The two slide mounting grooves 302 of the ash collection box 3 extend in a same direction from the mounting notches 301 to the positioning grooves 303, as shown in FIG. 16. When the ash collection box 3 is mounted to the positioning and mounting ring 5, the mounting columns 501 are respectively engaged with the corresponding positioning grooves 303, through the mounting notches 301 and the slide mounting grooves 302. The structural for realizing detachable assembly of the ash collection box 3 and the positioning and mounting ring 5 is simple, enables the ash collection box 3 to be stably mounted on the positioning and mounting ring 5 and allows the ash collection box 3 to be assembled and disassembled easily.

The specific operating principle for switching between low-temperature smoking and high-temperature roasting is as follows. When the pellet grill is to be used for low-temperature smoking, the operation knob S9 is controlled to rotate forwards or reversely to drive the cover plate S5 to move forwards or backwards to enable the first fire-pervious through grooves S411 and the second fire-pervious through grooves S51 to be staggered, such that the all the first fire-pervious through grooves S411 are sealed by the rectangular cover S501, and at this moment, food on the wire grid S3 can be smoked at a low temperature. When the pellet grill is to be used for high-temperature roasting, the operation knob S9 is controlled to rotate forwards or reversely to drive the cover plate S5 to move forwards or backwards to enable the first fire-pervious through grooves S411 and the second fire-pervious through grooves S51 to be vertically aligned, and at this moment, the first fire-pervious through grooves S411 and the second fire-pervious through grooves S51 are vertically communicated, and food on the wire grid S3 can be roasted at a high temperature.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pellet grill, comprising:
   a grill body;
   a burning chamber, arranged in the grill body;
   a wire grid, arranged in the grill body, and arranged above the burning chamber; and
   a pellet inlet, formed in a lateral portion of the grill body,
   wherein a fire-proof partition plate is arranged between the wire grid and the burning chamber, and the fire-proof partition plate partitions an inner cavity of the grill body into an upper cavity and a lower cavity which are independent from each other, the burning chamber is arranged in the lower cavity, the wire grid is arranged above the upper cavity,
   a fire-pervious window is arranged on the fire-proof partition plate and is located above the burning chamber, and an opening and closing device for controlling the fire-pervious window to be opened to realize higher temperature or closed to realize lower temperature is arranged on the fire-pervious window, and
   an ash removal mechanism for removing ash accumulated in the burning chamber is arranged on the grill body,
   wherein the fire-pervious window is formed with a plurality of first fire-previous through grooves vertically penetrating through the fire-pervious window, the plurality of first fire-previous through grooves are parallel to and spaced apart from one another in a front-back direction, the opening and closing device comprises a cover plate which is attached to and covers the fire-pervious window, the cover plate is formed with second fire-pervious through grooves vertically penetrating through the cover plate and matched with the first fire-pervious through grooves, each of the second fire-pervious through grooves is correspondingly arranged above a respective one of the first fire-pervious through grooves, and the cover plate is movably arranged on the fire-pervious window in the front-back direction; when the first fire-pervious through grooves and the second fire-pervious through grooves are vertically aligned, the fire-pervious window is opened to realize higher temperature; and when the first fire-pervious through grooves and the second fire-pervious through grooves are vertically staggered, the fire-pervious window is closed to realize lower temperature,
   wherein the fire-pervious window is a rectangular protrusion arranged on the fire-proof partition plate, the first fire-pervious through grooves are formed in an upper surface of the rectangular protrusion, two side surfaces of the rectangular protrusion are arranged in the front-back direction and are perpendicular to a front mounting plate of the grill body, a rectangular cover matched with the rectangular protrusion is arranged on the cover plate and protrudes upwards, the second fire-pervious through grooves are formed in the rectangular cover which covers the rectangular protrusion, a lower surface of the rectangular cover is attached to the upper surface of the rectangular protrusion, two inner side surfaces of the rectangular cover are attached to corresponding side surfaces of the rectangular protrusion respectively, and a vertical distance between an inner front surface of the rectangular cover and an inner back surface of the rectangular cover is greater than a vertical distance between a front surface of the rectangular protrusion and a back surface of the rectangular cover.

2. The pellet grill according to claim 1, wherein a pushing mechanism for driving the cover plate to move in the front-back direction is arranged between the cover plate and the grill body, and the pushing mechanism comprises a push rod arranged in the grill body and perpendicular to the front mounting plate of the grill body, a front end of the push rod is coaxially connected to a screw, a nut matched with the screw is arranged on an inner wall of the front mounting plate of the grill body, the screw is screwed in the nut, a front end of the screw stretches out of the front mounting plate of the grill body and is fixedly connected to an operation knob, a vertical mounting wall is arranged on a front portion of the cover plate, and a rear end of the push rod is fixedly arranged on the mounting wall.

3. The pellet grill according to claim 2, wherein the screw comprises a knob mounting portion and a screw portion which are coaxially arranged in the frontback direction, the knob mounting portion is arranged outside the grill body and is fixedly connected to the operation knob, the screw portion penetrates through the front mounting plate of the grill body and is screwed in the nut, and a rear end of the screw portion stretches out of the nut and is coaxially and fixedly connected to the push rod.

4. The pellet grill according to claim 1, wherein a first ash falling port is formed in a bottom portion of the lower cavity and vertically penetrates through the bottom portion of the lower cavity, a second ash falling port matched with the first ash falling port is formed in a bottom portion of the burning chamber and vertically penetrates through the bottom portion of the burning chamber, the bottom portion of the burning chamber is attached to an inner surface of the bottom portion of the lower cavity, and the second ash falling port is arranged directly over the first ash falling port; the ash removal mechanism comprises an ash collection box arranged below the grill body, the ash collection box includes an ash collection cavity having a top opening, the ash collection cavity is arranged below the first ash falling port, and a partition plate is arranged between the first ash falling port and the ash collection cavity, and is formed with an ash removal port matched with the first ash falling port and vertically penetrating through the partition plate, the partition plate is rotatably attached to a lower surface of a bottom portion of the grill body; when the ash removal port and the first ash falling port are aligned, the first ash falling port is communicated with the ash collection cavity for ash removal; and when the ash removal port and the first ash falling port are staggered, the first ash falling port is separated from the ash collection cavity by the partition plate.

5. The pellet grill according to claim 4, wherein a rotary mounting hole is formed in a center of the partition plate and vertically penetrates through the partition plate, a mounting bolt matched with the rotary mounting hole penetrates through the rotary mounting hole, a rod portion of the mounting bolt penetrates through the rotary mounting hole from bottom to top and is screwed to the bottom portion of the grill body, the rotary mounting hole and the rod portion of the mounting bolt are rotatably connected, and the ash removal port is located in one side of the rotary mounting hole; and a support spring is disposed around the mounting bolt, and two ends of the support spring are respectively supported the partition plate and a head portion of the mounting bolt, so that an upper surface of the partition plate is closely attached to the lower surface of the bottom portion of the grill body.

6. The pellet grill according to claim 4, wherein a rotation control mechanism is arranged on the partition plate, and is configured for driving rotation of the partition plate to enable communication or separation of the first ash falling port and the ash collection cavity;

the partition plate is circular, the rotation control mechanism comprises a positioning and mounting ring disposed around the partition plate and fixedly arranged on the lower surface of the bottom portion of the grill body, a guide slot is formed in a side wall of the positioning and mounting ring and penetrates through the positioning and mounting ring, a horizontal rotary control lever is arranged on a lower surface of the partition plate, a first end of the rotary control lever is fixedly mounted on the lower surface of the partition plate, a second end of the rotary control lever penetrates through the guide slot and is arranged outside the positioning and mounting ring, and the rotary control lever is slidable along the guide slot to drive the partition plate to rotate.

7. The pellet grill according to claim 6, wherein when the rotary control lever is located at a first end of the guide slot, the first ash falling port and the ash removal port are in an aligned state, and when the rotary control lever is located at a second end of the guide slot, the first ash falling port and the ash removal port are in a staggered state; a lock slot is arranged at the second end of the guide slot, corresponding to the staggered state of the first ash falling port and the ash removal port, a width of the lock slot in a vertical direction is greater than a width of the guide slot in the vertical direction, the lock slot is communicated with the guide slot, and a lock pillar matched with the lock slot is movably disposed around the rotary control lever; when the lock pillar is engaged with the lock slot, the first ash falling port and the ash removal port are locked in the staggered state, and a lock support mechanism for stably engaging the lock pillar with the lock slot is arranged between the lock pillar and the second end of the rotary control lever;

a limiting portion is coaxially arranged on the lock pillar in a direction towards the second end of the rotary control lever, an outer diameter of the limiting portion is greater than an outer diameter of the lock pillar, a first limiting ring is coaxially arranged on the limiting portion in the direction towards the second end of the rotary control lever, an outer diameter of the first limiting ring is greater than the outer diameter of the limiting portion, a second limiting ring is coaxially arranged at the second end of the rotary control lever, the lock support mechanism is a lock spring arranged between the first limiting ring and the second limiting ring, and the lock spring is disposed around the rotary control lever; in a lock state, the lock pillar is engaged with the lock slot, the limiting portion abuts against an outer wall of the positioning and mounting ring, and two ends of the lock spring abut against two end surfaces, facing each other, of the first limiting ring and the second limiting ring, respectively.

8. The pellet grill according to claim 6, wherein the ash collection box is detachably mounted below the positioning and mounting ring, and the ash collection box is a cylindrical ash collection box matched with the positioning and mounting ring, two mounting columns protrudes from an outer wall of the positioning and mounting ring, the two mounting columns are opposite to each other, the ash collection box has two mounting parts respectively matched with the mounting columns, each of the mounting parts includes a vertical mounting notch, a horizontal slide mounting groove extending from a lower end of the mounting notch and communicated with the vertical mounting notch, and a positioning groove extending upward from a tail end of the slide mounting groove, and the two slide mounting grooves of the two mounting parts extend in a same direction from the mounting notches to the positioning grooves; and when the ash collection box and the positioning and mounting ring are mounted to each other, the mounting columns respectively engage with the positioning grooves.

9. The pellet grill according to claim 1, wherein a pushing mechanism for driving the cover plate to move in the front-back direction is arranged between the cover plate and the grill body, and the pushing mechanism comprises a push rod arranged in the grill body and perpendicular to a front mounting plate of the grill body, a front end of the push rod is coaxially connected to a screw, a nut matched with the screw is arranged on an inner wall of the front mounting plate of the grill body, the screw is screwed in the nut, a front end of the screw stretches out of the front mounting plate of the grill body and is fixedly connected to an operation knob, a vertical mounting wall is arranged on a front portion of the cover plate, and a rear end of the push rod is fixedly arranged on the mounting wall.

10. The pellet grill according to claim 9, wherein the screw comprises a knob mounting portion and a screw portion which are coaxially arranged in the frontback direction, the knob mounting portion is arranged outside the grill body and is fixedly connected to the operation knob, the screw portion penetrates through the front mounting plate of the grill body and is screwed in the nut, and a rear end of the screw portion stretches out of the nut and is coaxially and fixedly connected to the push rod.

\* \* \* \* \*